Figure 1:
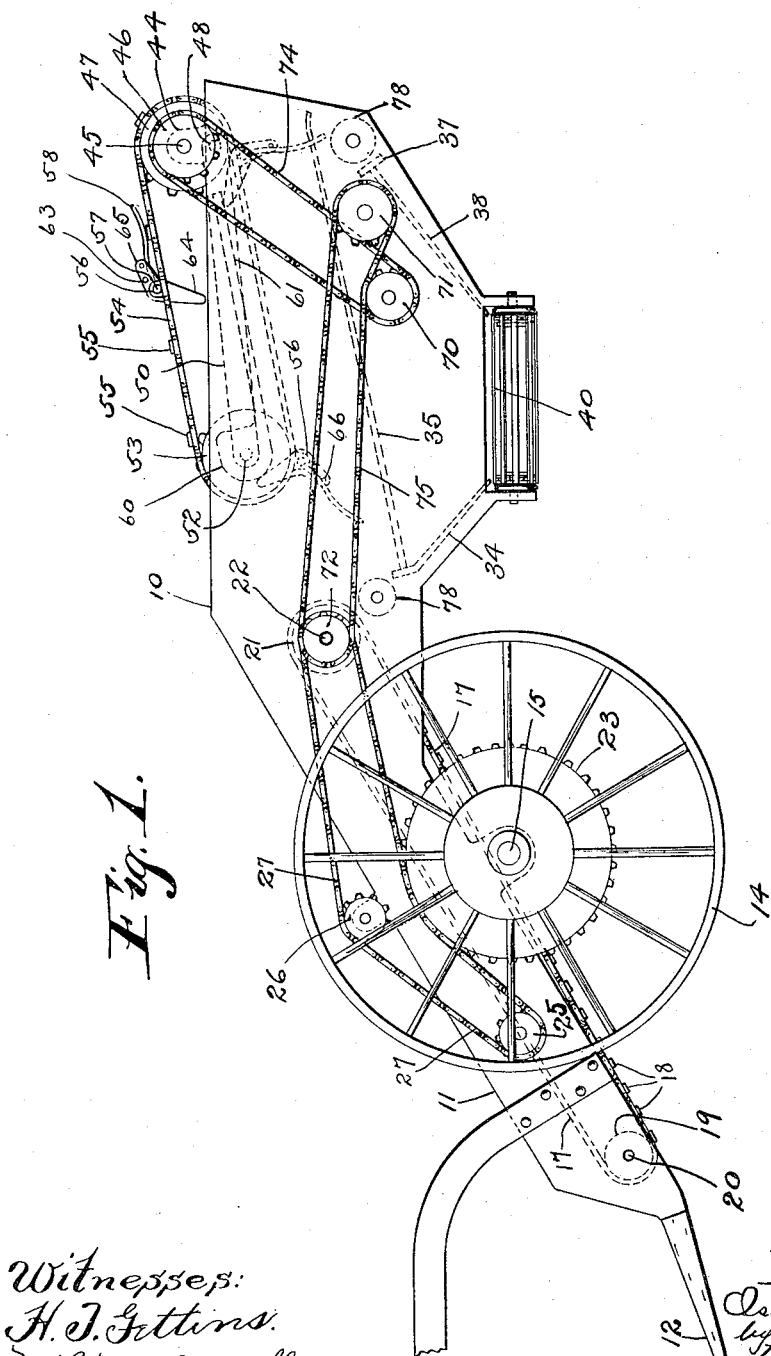

I. W. HOOVER.
COMBINED POTATO DIGGER AND VINE SEPARATOR.
APPLICATION FILED MAR. 31, 1911.

1,130,403.

Patented Mar. 2, 1915.
3 SHEETS—SHEET 1.

Witnesses:
H. J. Gittins.
N. L. McDonnell.

Inventor:
Isaac W. Hoover
by Lynch & Dover
his Attorneys

I. W. HOOVER.
COMBINED POTATO DIGGER AND VINE SEPARATOR.
APPLICATION FILED MAR. 31, 1911.

1,130,403.

Patented Mar. 2, 1915.
3 SHEETS—SHEET 2.

Witnesses:
H. J. Gettins
N. L. McDonnell

Inventor:
Isaac W. Hoover
by Lynch & Dorer
his Attorneys.

I. W. HOOVER.
COMBINED POTATO DIGGER AND VINE SEPARATOR.
APPLICATION FILED MAR. 31, 1911.
1,130,403.
Patented Mar. 2, 1915
3 SHEETS—SHEET 3.
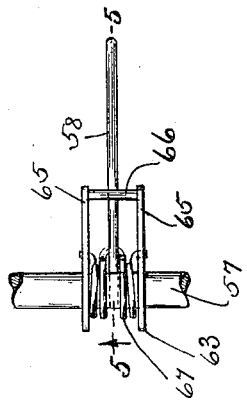
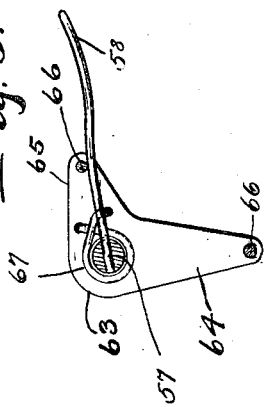
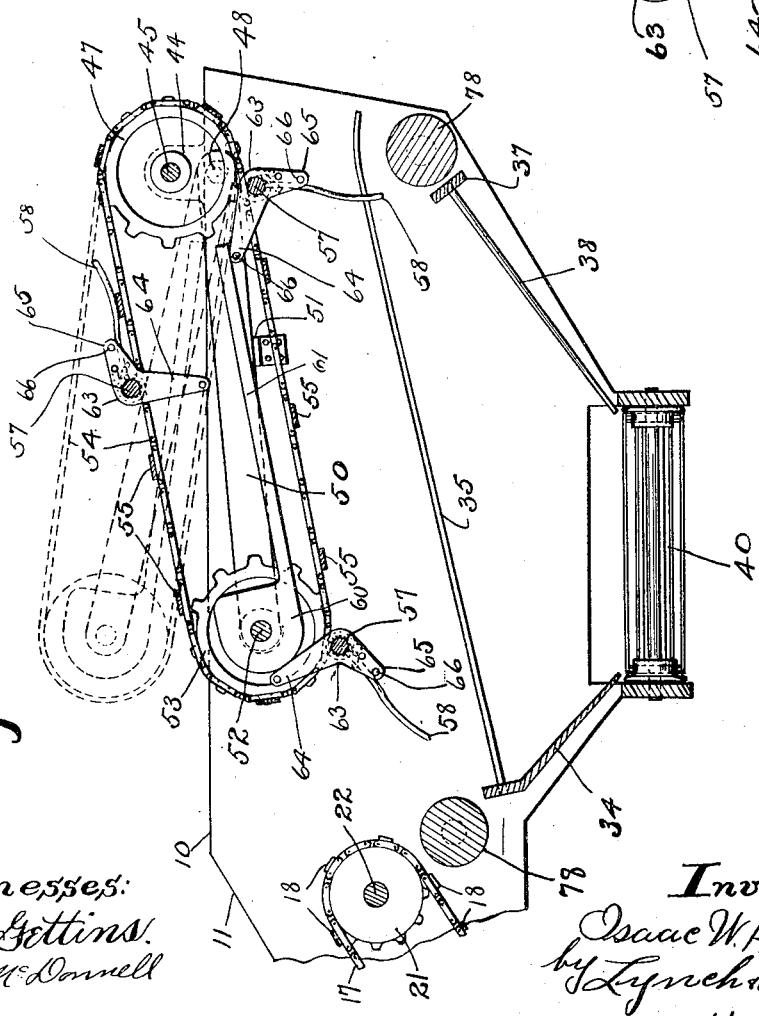
Witnesses:
H. J. Gettins
N. L. McDonnell
Inventor:
Isaac W. Hoover
by Lynch & Dore
his Attorneys.

UNITED STATES PATENT OFFICE.

ISAAC W. HOOVER, OF AVERY, OHIO.

COMBINED POTATO-DIGGER AND VINE-SEPARATOR.

1,130,403. Specification of Letters Patent. Patented Mar. 2, 1915.

Application filed March 31, 1911. Serial No. 618,073.

*To all whom it may concern:*

Be it known that I, ISAAC W. HOOVER, a citizen of the United States of America, residing at Avery, in the county of Erie and State of Ohio, have invented certain new and useful Improvements in Combined Potato-Diggers and Vine-Separators; and I hereby declare the following to be a full, clear, and exact description of the invention, such as will enable others skilled in the art to which it pertains to make and use the same.

This invention relates to improvements in combined potato diggers and vine separators and is an improvement over the potato digger and vine separator forming the subject matter of Patent No. 980,953 granted to A. L. Hoover.

In the patent above referred to there is shown a potato digger and vine separator including a frame supported on suitable ground wheels and carrying at its forward end a plow or digger member. Supported between the sides of the frame is an elevator or conveyer which is designed to carry the potatoes and vines rearwardly and upwardly and at the rear of the elevator is a vine separator which comprises a series of slats mounted upon endless chains. The chains are supported on sprocket wheels and means are provided for driving the sprocket wheels so that the upper reach of each chain will travel rearwardly. The potatoes and vines are deposited by the elevator on this conveyer and the movement of the conveyer shakes the potatoes loose from the vines and the potatoes fall down between the slats of the conveyer into a suitable hopper while the vines remain on the conveyer and are dumped at the rear of the machine.

The present invention relates more particularly to certain improvements in the vine separating mechanism and the object thereof is to provide positive means for separating the vines from the potatoes so as to insure the potatoes being freed from all portions of the vines and to guard against the possibility of any potatoes remaining on the vines and being dumped with the refuse.

The invention, therefore, consists in certain novel details of construction and combination and arrangement of parts described in the specification, pointed out in the claim and illustrated in the accompanying drawings.

Figure 2:
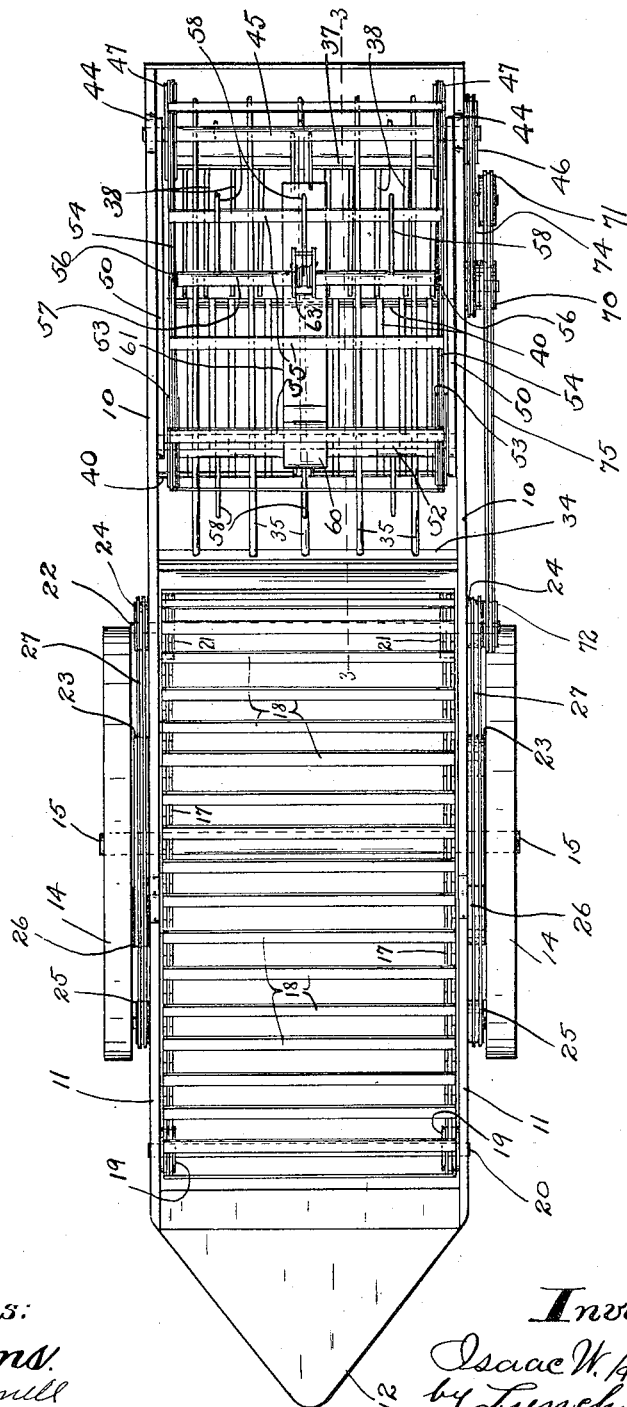

Referring to the accompanying drawings Figure 1 is a side elevation of a combined potato digger and vine separator embodying the novel features of the present invention. Fig. 2 is a plan view of the same. Fig. 3 is an enlarged section on line 3—3, Fig. 2. Fig. 4 is an enlarged detail of a portion of the machine as will be more fully described later. Fig. 5 is a section on line 5—5, Fig. 4.

Referring to the drawings it will be seen that the frame of the machine consists of two side members 10 having forwardly and downwardly extending portions 11, which at their lower ends carry a plow or digging member 12. This frame is supported in any suitable manner upon a truck including a pair of ground wheels 14 and an axle 15 to which the wheels are rigidly secured. Located between the portions 11 of the frame is an elevator in the form of an endless conveyer, which in the present case consists of a pair of endless chains 17 connected together by rather closely spaced cross bars or slats 18. The chains 17 engage a pair of sprocket wheels 19 mounted upon a shaft 20 at the forward end of the frame and a pair of sprocket wheels 21 mounted upon a shaft 22 which extends between the portions 11 where they merge in the side members 10. The shaft 22 projects beyond both sides of the frame for a purpose which will appear later. This elevator is preferably driven from the ground wheels 14 through the axle 15 which rotates with the ground wheels as follows:—On the axle 15 at each side of the frame are secured two comparatively large sprocket wheels 23. On each end of the shaft 22 are secured sprocket wheels 24 and on each side of the frame on the outer face thereof are supported small idler sprockets 25 and 26. A sprocket chain 27 is arranged at each side of the frame on the sprocket wheel 24 and on the idlers 25 and 26 and the lower reaches of said sprocket chains 27 engage the sprocket wheels 23 on the axle 15. This elevator, the upper reach of which is designed to travel rearwardly, receives the potatoes, vines and other vegetation which are dug by the plow or digging member 12 and carries the same to the back of the machine where they are deposited on a screen supported at the rear of the elevator between the side members 10. This screen is arranged as follows:—An inclined plate 34 extends between the side members 10 just below the rear end of the said elevator and from this plate resilient rods 35 extend rearwardly approximately to the end of the side frame. These rods are spaced a sufficient distance apart so that when the potatoes and vines are dumped thereon the potatoes will fall through between the rods while the vines will be retained on the rods. A short distance below the rear ends of the rods 35 a bar 37 extends between the side members 10 and from this bar spaced rods 38 extend downwardly toward the bottom of the frame forming an auxiliary screen. In the bottom of the frame is arranged a surface 40 which receives the potatoes as they fall through the screen.

Above the screen and at the rear of the elevator is arranged the vine separator, which as its name implies, is designed to separate the potatoes from the vines and other vegetation and convey the latter rearwardly and deposit the same on the ground, at the rear of the machine. The separator is mounted as follows:—At the upper edge of each side member 10 of the frame near the rear end thereof is formed a small bearing 44 and in these bearings 44 is mounted a shaft 45 so that the said shaft extends from side to side of said frame and one end thereof extends beyond the frame at one side. On the end of said shaft 45 where it projects beyond the side of said frame is secured a sprocket wheel 46. Near each end of said shaft 45, within the frame, is secured a sprocket wheel 47. On the inner face of each side member 10 of the frame in proximity to the bearing 44 is arranged a small stud 48 and on each of said studs 48 is pivoted one end of a flat bar 50. Stops 51 are mounted on the inner faces of the side members 10 which limit the downward movement of said bars 50 but leave them free to move or swing upwardly. The free ends of said bars 50 are connected to a shaft 52 which extends across the frame and has its ends journaled in the said bars 50. At the ends of said shaft 52 in line with the sprocket wheels 47 on the shaft 45 are mounted sprocket wheels 53. The sprocket wheels 47 and 53 at each side of the frame are connected by a sprocket chain 54 and the said sprocket chains 54 are connected by brace bars 55. On each chain 54 is arranged a number of bearings 56 and shafts or rods 57 extend between the chains 54 and have their ends journaled in said bearings 56. In each of the rods 57 is rigidly secured a number of prongs or tines 58. In order that these prongs may lie approximately flat or parallel with the chain 54 when said chain is passing above its supporting sprockets and may extend outwardly from the chain when the chain is passing down around and below the supporting sprockets the following arrangement is provided:—On the shaft 52, near the center thereof, is mounted a track forming member comprising a head 60, the outer edge of which is curved concentric with the said shaft and integral with said head is an arm 61 which has a flat surface forming a continuation of the curved surface of the head 60. On each of the shafts or rods 57, near the center thereof, is mounted a pair of plates 63, the plates being preferably arranged at each side of the center prongs on the said shafts or rods 57. Each of the said plates 63 is similar in shape to a bell crank lever, having a long arm 64 and a shorter arm 65 arranged at an angle thereto and each pair of plates is preferably connected by pins 66. Each pair of plates is locked to the shaft on which the said plates are mounted by means of a binding wire 67 which is looped over the center prong on the shaft and the ends of the wire are then carried around the shaft in a coil and one end of the wire is secured in a small opening in each of the plates 63, so that the said plates are firmly yet resiliently connected to the said shafts or rods 57.

On the outside of one of the side members 10 is mounted a double sprocket wheel 70 and a single sprocket wheel 71, and on the outer end of the shaft 22 is secured a sprocket wheel 72. A sprocket chain 74 extends around the sprocket wheel 70 and around the sprocket wheel 46 on the shaft 45 and a sprocket chain 75 extends around the sprocket wheel 72 and around the sprocket wheel 71 and above and in contact with the sprocket wheel 70. Now, as we heve seen before, when the ground wheels are driven the shaft 22 is also driven through its operative connection with said ground wheels and therefore the chain 75 will also be driven through its connection with the sprocket wheel 72 and the said chain 75 will in turn drive the double sprocket wheel 70 which in turn will drive the sprocket chain 74 and the sprocket wheel 46. Now, as the wheel 46 is secured on the shaft 45, when the said wheel 46 is driven the shaft 45 will be rotated which will carry around the sprocket wheels 47, thereby driving the chains 54 of the separator.

Now, when the chains 54 are driven the plates 63 while being carried along above the sprocket wheels which support said chains will have their longer arms extending downwardly while the shorter arms, together with the prongs will extend approximately parallel with the chains. Now as the chains are carried around the sprocket wheels the longer arms of said plates will come in contact with the track forming member and the longer arms will be caused to swing up toward the chains while the shorter arms will swing outwardly from the chains which will of course cause a rotation of the shafts or rods 57 causing the prongs carried by said rods to swing outwardly from the chains, and the prongs will be held in this position as long as the longer arms of the plates are in contact with the track forming member.

The operation of the vine separator is as follows:—The potatoes and vines will be carried up the elevator as before described and dumped on the screen immediately at the rear of the elevator. Now as the chains carrying the prongs are driven the said prongs, as they approach the rear of the elevator, will be swung over and down as the chain moves around the forward sprocket wheels and the said prongs will engage the mass of vines and potatoes dumped at the rear of the elevator and will draw them rearwardly over the screen. As the vines and potatoes are drawn along the potatoes will separate themselves from the vines and fall through the screen to the bottom of the frame and the vines will be carried along on top of the screen by the movement of the prongs or tines and deposited on the ground at the back of the frame. Now if more vines and potatoes or other material be deposited on the screen by the elevator than can be accommodated by the separator frame when in its normal position then when the prongs on the chains come in contact therewith the whole frame of the separator will swing up on the studs 48 as pivots and assume the position shown in dotted lines in Fig. 3, and the prongs in engagement with the material will then be able to drag it along the screen and force it out at the rear thereof. The end of the screen being unsupported will also yield under pressure allowing a larger opening or passage at the rear of the machine if required. Small rollers 78 are preferably provided at each end of the screen to assist the movement of the material.

What I claim is,—

In a device of the character described, the combination of an outer frame, a vine separator mounted in said frame, said vine separator comprising a frame pivotally supported in the outer frame, a shaft mounted at the rear end of said separator frame, a shaft mounted at the front end of said separator frame, sprocket wheels mounted on said shafts, sprocket chains carried by said sprocket wheels, shafts journaled on said chains, prongs rigidly mounted on said shafts, a pair of bell-lever-shaped plates secured on each of the prong carrying shafts, one plate being arranged at each side of the central prong thereon, means for forming a resilient connection between said bell-lever shaped plates on each shaft and the central prong thereon and a track forming member mounted on the forward shaft of the separator frame and having a rearwardly extending portion lying parallel with the chains, and the arrangement is such that when the said plates are traveling over the forward end and along the under side of the separator frame one of the arms of each plate will come in contact with said track forming member and cause a rotation of the prong carrying shafts to which said plates are secured and means for driving said chains.

In testimony whereof, I sign the foregoing specification, in the presence of two witnesses.

ISAAC W. HOOVER.

Witnesses:
VICTOR C. LYNCH,
N. L. McDONNELL.

Copies of this patent may be obtained for five cents each, by addressing the "Commissioner of Patents, Washington, D. C."